US012630476B2

(12) United States Patent　　(10) Patent No.:　US 12,630,476 B2
Kikuchi et al.　　　　　　　　　(45) Date of Patent:　May 19, 2026

(54) HEAT-RESISTANT MEMBER

(71) Applicant: KYOCERA Corporation, Kyoto (JP)

(72) Inventors: Kentaro Kikuchi, Kirishima (JP);
Satoshi Toyoda, Kirishima (JP);
Takahiro Ueno, Kirishima (JP);
Hidehiro Takenoshita, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 1124 days.

(21) Appl. No.: 17/424,459

(22) PCT Filed: Jan. 29, 2020

(86) PCT No.: PCT/JP2020/003190
§ 371 (c)(1),
(2) Date: Jul. 20, 2021

(87) PCT Pub. No.: WO2020/158806
PCT Pub. Date: Aug. 6, 2020

(65) Prior Publication Data
US 2022/0073430 A1　　Mar. 10, 2022

(30) Foreign Application Priority Data

Jan. 30, 2019　(JP) ................................ 2019-014446

(51) Int. Cl.
C04B 35/117　　　(2006.01)

(52) U.S. Cl.
CPC ........ C04B 35/117 (2013.01); C04B 2235/36 (2013.01)

(58) Field of Classification Search
CPC ............... C04B 35/117; C04B 2235/36; C04B 41/5031; C04B 2235/96; C04B 2237/343; B32B 18/00
See application file for complete search history.

(56) References Cited

U.S. PATENT DOCUMENTS

| | | | |
|---|---|---|---|
| 4,104,075 A | | 8/1978 | Hayashi et al. |
| 4,340,635 A | * | 7/1982 | Langman ............... C04B 35/111 428/164 |
| 4,631,160 A | | 12/1986 | Langman et al. |
| 2011/0251042 A1 | | 10/2011 | Araki et al. |

FOREIGN PATENT DOCUMENTS

| | | |
|---|---|---|
| CN | 105237012 A | 1/2016 |
| EP | 2190085 A1 | 5/2010 |
| JP | S52-90507 A | 7/1977 |
| JP | S57-118079 A | 7/1982 |
| JP | 2001-2464 A | 1/2001 |
| JP | 2002-246144 A | 8/2002 |
| JP | 2017-115789 A | 6/2017 |

* cited by examiner

*Primary Examiner* — Amber R Orlando
*Assistant Examiner* — Cameron K Miller
(74) *Attorney, Agent, or Firm* — Procopio, Cory, Hargreaves & Savitch LLP

(57)　　　　　　ABSTRACT

A heat-resistant member of the present disclosure is formed of an alumina-based ceramic containing alumina crystals and a glass formed of Si, Ca, Mg, and O, and an area ratio occupied by the glass in an inner portion is larger than an area ratio occupied by the glass in the surface portion.

4 Claims, No Drawings

HEAT-RESISTANT MEMBER

TECHNICAL FIELD

The present disclosure relates to a heat-resistant member.

BACKGROUND ART

A heat-resistant member that is less likely to be damaged even when used at a temperature of approximately 600° C. is used in a product that is assumed to be used at high temperatures, such as a heater used for heating the interior of a vehicle, for example.

Here, as a material of the heat-resistant member, an alumina-based ceramic that is resistant to oxidation even at a temperature of approximately 600° C. in an atmospheric environment and that can be used for a long period of time is widely employed (see Patent Document 1, for example).

CITATION LIST

Patent Document

Patent Document 1: JP 2001-2464 A

SUMMARY

A heat-resistant member of the present disclosure is formed of an alumina-based ceramic containing alumina crystals and a glass formed of Si, Ca, Mg, and O, and an area ratio occupied by the glass in an inner portion is larger than an area ratio occupied by the glass in a surface portion.

DESCRIPTION OF EMBODIMENTS

A detailed description of the heat-resistant member of the present disclosure will be given below.

The heat-resistant member of the present disclosure contains the alumina crystals and the glass. The heat-resistant member of the present disclosure includes the alumina-based ceramic containing the alumina crystals and the glass. The constituents of the glass are silicon (Si), calcium (Ca), magnesium (Mg), and oxygen (O). Here, the glass is a mixed glass containing a calcium oxide (CaO) and a magnesium oxide (MgO) in a silicon oxide ($SiO_2$).

In the heat-resistant member of the present disclosure, the area ratio occupied by the glass in the inner portion is larger than the area ratio occupied by the glass in the surface portion. Here, the surface portion refers to a region from the surface of the heat-resistant member to a depth of 0.1 mm, including the surface of the heat-resistant member. Meanwhile, the internal portion refers to a region having a depth of 0.5 mm or more from the surface of the heat-resistant member.

By satisfying such a configuration, the heat-resistant member of the present disclosure has excellent thermal shock resistance and excellent mechanical strength. Generally, the alumina crystals have better mechanical strength than the glass. The glass has better thermal shock resistance than the alumina crystals. In general, thermal shock is likely to occur starting from the inner portion. In the heat-resistant member of the present disclosure, the area ratio occupied by the glass in the inner portion is larger than the area ratio occupied by the glass in the surface portion. Thus, the heat-resistant member of the present disclosure has high thermal shock resistance. In the heat-resistant member of the present disclosure, the area ratio occupied by the alumina crystals in the surface portion is larger than the area ratio occupied by the glass in the inner portion. Thus, the heat-resistant member of the present disclosure has excellent mechanical strength in the surface portion. Thus, cracks are unlikely to form in the surface portion of the heat-resistant member.

Here, excellent mechanical strength means that the value of three-point bending strength at room temperature (25° C.) in accordance with JIS R 1601-2008 is 280 MPa or more.

Excellent thermal shock resistance means that the heat resistance temperature in an underwater dropping test is 250° C. or more. Here, the heat resistance temperature in an underwater dropping test is the maximum value of the temperature difference T2–T1 (° C.) at which cracks or chips do not occur in a test piece of 3 mm×4 mm×36 mm when the test piece heated to T2 (° C.) is dropped into water of T1 (° C.), which is a temperature lower than T2.

The main constituent of the heat-resistant member of the present disclosure is alumina ($Al_2O_3$) containing aluminum (Al) and oxygen (O) as constituent elements. Alumina may be present in a crystal form (alumina crystals). The alumina crystals may be $\alpha$-$Al_2O_3$ crystals ($\alpha$-alumina crystals). The heat-resistant member of the present disclosure being formed of the alumina-based ceramic means that the lower limit of the content of Al when converted in terms of $Al_2O_3$ is 70 mass % or more.

The upper limit of the content of Al in terms of $Al_2O_3$ contained in the heat-resistant member of the present disclosure may be 93 mass %.

The heat-resistant member of the present disclosure may be the alumina-based ceramic in which the content of all constituents of 100 mass % is Al of 70 mass % or more and 89 mass % or less in terms of $Al_2O_3$ and the sum of the values of Si in terms of $SiO_2$, Ca in terms of CaO, and Mg in terms of MgO is 11 mass % or more and 30 mass % or less.

Note that the heat-resistant member of the present disclosure may contain, for example, unavoidable impurities of 0.3 mass % or less in addition to Al, Si, Ca, Mg, and O. The unavoidable impurities may be, for example, Na, Fe, and Ti, and the contents of all constituents of 100 mass % may be Na of 0.01 mass % or more and 0.1 mass % or less in terms of $Na_2O$, Fe of 0.01 mass % or more and 0.1 mass % or less in terms of $Fe_2O_3$, and Ti of 0.01 mass % or more and 0.1 mass % or less in terms of $TiO_2$.

Next, whether the heat-resistant member of the present disclosure contains the alumina crystals and the glass may be confirmed by the following method. First, the heat-resistant member of the present disclosure is pulverized and then measured using an X-ray diffractometer (XRD). The presence of the alumina crystals can be confirmed by performing identification using a JCPDS card from the value of the obtained 2θ (2θ indicates a diffraction angle). The presence or absence of the glass can be confirmed by the presence of a halo pattern on the low-angle side.

As a method for confirming that silicon (Si), calcium (Ca), magnesium (Mg), and oxygen (oxygen) are the constituents of the glass, the heat-resistant member is cut and a section thereof polished to a mirror-like surface is observed. The observation surface is then observed with a scanning electron microscope (SEM), and when an amorphous portion other than crystals is confirmed by an energy dispersive X-ray spectrometer (EDS) attached to the SEM, the portion is a glass, and by analyzing fluorescent X-rays (characteristic X-rays) generated by irradiating the portion with an electron beam, it is possible to confirm whether the glass contains silicon, calcium, magnesium, and oxygen.

The content of the constituents constituting the heat-resistant member of the present disclosure may be confirmed by the following method. First, quantitative analysis of the constituents contained in the heat-resistant member is performed using an ICP emission spectrophotometer (ICP). Next, from the contents of aluminum (Al), silicon (Si), calcium (Ca), and magnesium (Mg) measured by the ICP, each content may be calculated in terms of an oxide.

Note that, among all the constituents of 100 mass %, the sum of the content of Si in terms of $SiO_2$, the content of Ca in terms of CaO, and the content of Mg in terms of MgO is 8 mass % or more and 30 mass % or less, and the content of Si in terms of $SiO_2$ may be 6 mass % or more and 17 mass % or less, the content of Ca in terms of CaO may be 0.5 mass % or more and 9 mass % or less, and the content of Mg in terms of MgO may be 0.5 mass % or more and 5 mass % or less.

The area ratios occupied by the glass in the surface portion and the inner portion may be confirmed by the following method. First, a surface obtained by polishing the surface of the heat-resistant member into a mirror-like surface is defined as a first observation surface. A surface obtained by cutting the heat-resistant member so as to expose an inner portion of the heat-resistant member and polishing a cut section thus obtained into a mirror-like surface is defined as a second observation surface. Next, photographs of the surface portion of the first observation surface and the inner portion of the second observation surface are taken with the SEM. At this time, each photograph of the surface portion and the inner portion is taken with the SEM at a multiplication factor of 2000 times or more and 4000 times or less. The photographing area of the photograph of each of the surface portion and the inner portion is set to be 2000 $\mu m^2$ or more and 8000 $\mu m^2$ or less.

Next, in the photographs, the glass portions are traced and filled in black. The area ratios occupied by the glass in the surface portion and the inner portion are calculated by performing image analysis on the traced image by using a particle analysis method of the image analysis software "A zou kun" (trade name, manufactured by Asahi Kasei Engineering Corporation, and, hereinafter, when the image analysis software "A zou kun" is mentioned in the following, it refers to the image analysis software manufactured by Asahi Kasei Engineering Corporation). Note that, as for the analysis conditions of "A zou kun", the brightness of particles is set to "dark", the binarization method is set to "automatic", and the shading is set to "yes".

In the heat-resistant member of the present disclosure, the area ratio occupied by the glass in the surface portion may be less than the area ratio occupied by the glass in the inner portion by 4 area % or more. When such a configuration is satisfied, the mechanical strength of the heat-resistant member of the present disclosure is improved.

In the heat-resistant member of the present disclosure, the area ratio occupied by the glass in the surface portion may be 20 area % or less. When such a configuration is satisfied, since cracks are less likely to occur in the surface portion, the mechanical strength of the heat-resistant member of the present disclosure is improved.

Note that, in the heat-resistant member of the present disclosure, the area ratio occupied by the glass in the surface portion may be, for example, 5 area % or more. In the heat-resistant member of the present disclosure, the area ratio occupied by the glass in the internal portion may be, for example, 9 area % or more and 40 area % or less.

In the heat-resistant member of the present disclosure, an average equivalent circle diameter of the alumina crystals in the surface portion is preferably smaller than an average equivalent circle diameter of the alumina crystals in the inner portion.

In a case where the alumina crystals in the surface portion are smaller than the alumina crystals in the inner portion, not only are cracks less likely to form in the surface portion when thermal shock is applied to the heat-resistant member, but also cracks are less likely to spread in the inner portion even if cracks form in the surface portion. As a result, the thermal shock resistance of the heat-resistant member is improved.

In the heat-resistant member of the present disclosure, a mean distance between centers of gravity of the alumina crystals in the surface portion may be less than a mean distance between centers of gravity of the alumina crystals in the inner portion.

In a case where the mean distance between centers of gravity of the alumina crystals in the surface portion is less than the mean distance between centers of gravity of the alumina crystals in the inner portion, not only are cracks less likely to form in the surface portion when thermal shock is applied to the heat-resistant member, but also the spreading of cracks to the internal portion can be prevented even if cracks form in the surface portion. As a result, the thermal shock resistance of the heat-resistant member is improved.

The average equivalent circle diameters of the alumina crystals in the surface portion and in the inner portion can be measured as follows.

An observation surface is exposed by mirror-finishing a section of the heat-resistant member of the present disclosure. A surface analysis is performed on each of the surface portion and the inner portion among the observation surfaces with an electron probe microanalyzer (EPMA) within a range of multiplication factor of from approximately 2000 times to approximately 4000 times. In the color mapping of the surface analysis, a portion where a relatively large amount of aluminum (Al) is present and oxygen (O) is present is considered to be the alumina crystals.

Next, in the image taken by EPMA, the portion considered to be the alumina crystals is filled in black. The image analysis is performed on the image by using a particle analysis method of the image analysis software "A zou kun" (trade name, manufactured by Asahi Kasei Engineering Corporation, and, hereinafter, when the image analysis software "A zou kun" is mentioned in the following, it refers to the image analysis software manufactured by the Asahi Kasei Engineering Corporation). As for the analysis conditions of "A zou kun", for example, the brightness of crystal particles is set to "dark", the binarization method is set to "automatic", and the shading is set to "yes". The average value may be calculated from the equivalent circle diameter of each alumina crystal measured by the particle analysis. The measured number of crystals that are considered to be the alumina crystals is preferably 200 or more and 600 or less both in the surface portion and in the inner portion.

The mean distances between centers of gravity of the alumina crystals in the surface portion and in the inner portion can be measured as follows using the above-described traced image.

Image analysis is performed by applying a dispersion degree measurement method of "A zou kun". As for the analysis conditions of "A zou kun", it is only required, for example, that the brightness of particles be set to "dark", the binarization method be set to "automatic", the small figure removal area be set to 0.1 $\mu m$, the noise removal filter be set to "yes", the binary image correction be set to "line separation", and the display method be set to "superposition".

Since the heat-resistant member of the present disclosure has both excellent mechanical strength and thermal shock resistance, as described above, the heat-resistant member of the present disclosure can be widely used in various technical fields such as a heater member capable of rapidly raising temperature used for heating in vehicles, a flow path member for enabling flow of high-temperature and high-pressure gases and the like, a protective member for protecting human bodies from extremely high velocity flying objects, and the like.

Next, a method of manufacturing the heat-resistant member of the present disclosure will be described below.

First, an alumina ($Al_2O_3$) powder, a silicon oxide ($SiO_2$) powder, a calcium carbonate ($CaCO_3$) powder, and a magnesium carbonate ($MgCO_3$) powder are prepared.

Next, the alumina powder, the silicon oxide powder, the calcium carbonate powder, and the magnesium carbonate powder are weighed and mixed to obtain a mixed powder A. Next, the mixed powder A is wet ground by a known method such as ball milling, mixed with a known organic binder, and granulated by a known method such as spray drying.

Next, molding is performed using a known method such as press molding using a metal mold to obtain a compact A.

Next, the alumina powder is added to the mixed powder A to obtain a mixed powder B. Next, wet grinding is performed using a known method such as ball milling, and an organic binder (for example, nitrocellulose or the like) and an organic solvent (for example, terpineol or the like) are added to obtain a paste B. Here, the content of the organic binder in the paste B is, for example, 5 parts by mass or more and 15 parts by mass or less, and the content of the organic solvent in the paste B is, for example, 20 parts by mass or more and 40 parts by mass or less, when the mixed powder B is set to 100 parts by mass.

Next, the paste B is applied to the surface of the compact A by using a known method such as screen printing or spraying, and is dried to obtain a compact C in which a coating film of the paste B is formed on the surface of the compact A. At this time, the thickness of the coating film of the paste B is adjusted to be 0.1 mm after firing.

The composition of the mixed powder A and the mixed powder B is adjusted so that the average composition of the sintered body of the compact C is such that aluminum (Al) is 70 mass % or more and 89 mass % or less in terms of alumina ($Al_2O_3$), and the total content of silicon (Si) in terms of a silicon oxide ($SiO_2$), calcium (Ca) in terms of a calcium oxide (CaO), and magnesium (Mg) in terms of a magnesium oxide (MgO) is within a range of 11 mass % or more and 30 mass % or less.

Next, the compact C is fired in an air atmosphere at a temperature of 1300° C. or more and 1500° C. or less to obtain the heat-resistant member of the present disclosure.

Note that, by adjusting the amount of the alumina powder to be added when obtaining the mixed powder B, the area ratio occupied by the glass in the surface portion can be changed to an arbitrary value.

In order to produce a heat-resistant member in which the alumina crystals in the surface portion are smaller than the alumina crystals in the inner portion, the average particle diameter of the alumina powder to be added to the mixed powder B may be made smaller than the average particle diameter of the alumina powder contained in the mixed powder A. The same applies to a case where a heat-resistant member is produced in which the mean distance between centers of gravity of the alumina crystals in the surface portion is shorter than the mean distance between centers of gravity of the alumina crystals in the inner portion.

Hereinafter, examples of the present disclosure will be specifically described; however, the present disclosure is not limited to these examples.

Example 1

Samples having different compositions and different area ratios occupied by the glass in the surface portion and the inner portion were prepared and evaluated for mechanical strength and thermal shock resistance.

First, an alumina powder, a silicon oxide powder, a calcium carbonate powder, and a magnesium carbonate powder were prepared.

Next, the alumina powder, the silicon oxide powder, the calcium carbonate powder, and the magnesium carbonate powder were weighed and mixed so as to have the values shown in Table 1 in terms of mass ratio to obtain a mixed powder A. Here, in Table 1, a value of the calcium carbonate powder in terms of a calcium oxide (CaO) and a value of the magnesium carbonate powder in terms of a magnesium oxide (MgO) are expressed.

Next, the mixed powder A was wet ground by a known method such as ball milling, mixed with a known organic binder, and granulated by a known method such as spray drying.

Next, a compact A was obtained by performing press molding using a metal mold. At this time, the compact A was formed into a square rod shape of 2.8 mm×3.8 mm×35.8 mm after firing.

Next, an alumina powder, a silicon oxide powder, a calcium carbonate powder, and a magnesium carbonate powder were weighed and mixed so as to have the values shown in Table 1 in terms of mass ratio to obtain a mixed powder B. Here, in Table 1, a value of the calcium carbonate powder in terms of a calcium oxide (CaO) and a value of the magnesium carbonate powder in terms of a magnesium oxide (MgO) are expressed.

Next, wet grinding was performed using a known method such as ball milling, and nitrocellulose as an organic binder and terpineol as an organic solvent were added to obtain a paste B. Here, the content of the organic binder in the paste B was set to 10 parts by mass, and the content of the organic solvent in the paste B was set to 30 parts by mass, when the mixed powder B was set to 100 parts by mass.

Next, the paste B was applied to the surface of the compact A by using screen printing, and dried to obtain a compact C in which a coating film of the paste B was formed on the surface of the compact A. At this time, the thickness of the coating film of the paste B was adjusted to be 0.1 mm after firing.

Next, the compact C was fired in an air atmosphere at a temperature of 1450° C. to obtain each sample. Note that each sample had a square rod shape of 3 mm×4 mm×36 mm.

Next, the contents of constituents constituting each sample were calculated by performing quantitative analysis of each sample by using an ICP, and converting the contents of aluminum (Al), silicon (Si), calcium (Ca), and magnesium (Mg) measured by the ICP into oxide equivalents.

The area ratios occupied by the glass in the surface portion and the inner portion of each sample were confirmed by the following method. First, a surface obtained by polishing the surface of each sample into a mirror-like surface was defined as a first observation surface. A surface obtained by cutting each sample so that an inner portion of the sample was exposed and polishing a cut section thus obtained into a mirror-like surface was defined as a second observation surface. Next, photographs of the surface portion of the first observation surface and the inner portion of the second observation surface were taken with a SEM. At this time, each of the photographs of the surface portion and the inner portion was taken with the SEM at a multiplication factor of 3000 times. The photographing area of the photograph of each of the surface portion and the inner portion was set to be 4400 $\mu m^2$.

dropping test. Specifically, the maximum value of the temperature difference T2-25 (° C.) at which cracks or chips did not occur in each sample when each sample heated to T2 (° C.) was dropped into water of 25° C. was calculated. Here, measurement was performed in which T2 was started at 125° C. and was increased by 10° C.

The results are shown in Table 1.

TABLE 1

| SAMPLE NO. | MASS RATIO (-) | | | | | | | | COMPOSITION OF SINTERED BODY (MASS %) |
|---|---|---|---|---|---|---|---|---|---|
| | MIXED POWDER A | | | | MIXED POWDER B | | | | a |
| | $Al_2O_3$ | $SiO_2$ | CaO | MgO | $Al_2O_3$ | $SiO_2$ | CaO | MgO | $Al_2O_3$ |
| 1 | 0.9 | 0.06 | 0.025 | 0.015 | 0.93 | 0.042 | 0.018 | 0.011 | 90.4 |
| 2 | 0.68 | 0.192 | 0.08 | 0.048 | 0.7 | 0.18 | 0.075 | 0.045 | 68.2 |
| 3 | 0.82 | 0.108 | 0.045 | 0.027 | 0.78 | 0.0132 | 0.055 | 0.033 | 81.5 |
| 4 | 0.82 | 0.108 | 0.045 | 0.027 | 0.82 | 0.108 | 0.045 | 0.027 | 82 |
| 5 | 0.697 | 0.182 | 0.076 | 0.045 | 0.72 | 0.168 | 0.07 | 0.042 | 70 |
| 6 | 0.75 | 0.15 | 0.063 | 0.038 | 0.77 | 0.138 | 0.058 | 0.035 | 75.2 |
| 7 | 0.82 | 0.108 | 0.045 | 0.027 | 0.84 | 0.096 | 0.04 | 0.024 | 82.2 |
| 8 | 0.87 | 0.078 | 0.033 | 0.02 | 0.89 | 0.066 | 0.028 | 0.017 | 87.2 |
| 9 | 0.887 | 0.068 | 0.028 | 0.017 | 0.91 | 0.054 | 0.023 | 0.014 | 89 |
| 10 | 0.82 | 0.108 | 0.045 | 0.027 | 0.85 | 0.09 | 0.038 | 0.023 | 82.4 |
| 11 | 0.77 | 0.138 | 0.058 | 0.035 | 0.82 | 0.108 | 0.045 | 0.027 | 77.6 |
| 12 | 0.82 | 0.108 | 0.045 | 0.027 | 0.89 | 0.066 | 0.028 | 0.017 | 82.8 |
| 13 | 0.75 | 0.15 | 0.063 | 0.038 | 0.84 | 0.096 | 0.04 | 0.024 | 76.1 |
| 14 | 0.82 | 0.108 | 0.045 | 0.027 | 0.91 | 0.054 | 0.023 | 0.014 | 83.1 |
| 15 | 0.73 | 0.162 | 0.068 | 0.041 | 0.84 | 0.096 | 0.04 | 0.024 | 74.3 |

| SAMPLE NO. | COMPOSITION OF SINTERED BODY (MASS %) | | | | AREA RATIO OCCUPIED BY GLASS (AREA %) | | | THREE-POINT BENDING STRENGTH (MPa) | HEAT RESISTANCE TEMPERATURE (° C.) |
|---|---|---|---|---|---|---|---|---|---|
| | b $SiO_2$ | c CaO | d MgO | b + c + d (MASS %) | INNER PORTION | SURFACE PORTION | DIFFERENCE (INNER PORTION - SURFACE PORTION) | | |
| 1 | 5.79 | 2.41 | 1.45 | 9.6 | 7.2 | 5.3 | 1.9 | 296 | 210 |
| 2 | 19.1 | 7.94 | 4.76 | 31.8 | 42.5 | 39.6 | 2.9 | 267 | 230 |
| 3 | 11.1 | 4.62 | 2.77 | 18.5 | 22.7 | 24.9 | −2.2 | 254 | 250 |
| 4 | 10.8 | 4.5 | 2.7 | 18.0 | 22.7 | 22.7 | 0.0 | 251 | 250 |
| 5 | 18 | 7.51 | 4.5 | 30.0 | 40.1 | 37.2 | 2.9 | 280 | 250 |
| 6 | 14.9 | 6.19 | 3.71 | 24.8 | 33.3 | 30 | 3.30 | 283 | 250 |
| 7 | 10.7 | 4.44 | 2.66 | 17.8 | 22.7 | 20 | 2.7 | 285 | 250 |
| 8 | 7.66 | 3.19 | 1.91 | 12.8 | 15.5 | 12.7 | 2.8 | 286 | 250 |
| 9 | 6.62 | 2.76 | 1.65 | 11.0 | 8.4 | 5.4 | 3.0 | 283 | 250 |
| 10 | 10.6 | 4.41 | 2.65 | 17.6 | 22.7 | 18.7 | 4.0 | 1 | 250 |
| 11 | 13.4 | 5.6 | 3.36 | 22.4 | 30.0 | 22.7 | 7.3 | 297 | 250 |
| 12 | 10.3 | 4.29 | 2.58 | 17.2 | 22.7 | 12.7 | 10.0 | 310 | 250 |
| 13 | 14.4 | 5.98 | 3.59 | 23.9 | 33.3 | 20 | 13.3 | 312 | 250 |
| 14 | 10.2 | 4.23 | 2.54 | 16.9 | 22.7 | 5.4 | 17.3 | 307 | 250 |
| 15 | 15.4 | 6.42 | 3.85 | 25.7 | 36.4 | 20 | 16.4 | 303 | 250 |

Next, in the photograph, the glass portions were traced and filled in black. Image analysis of the traced image was performed using the particle analysis method of the image analysis software "A zou kun", so that the area ratios occupied by the glass in the surface portion and the inner portion in each sample were calculated. Note that, as for the analysis conditions of "A zou kun", the brightness of particles was set to "dark", the binarization method was set to "automatic", and the shading was set to "yes".

The three-point bending strength of each sample was calculated by a method generally in accordance with JIS R 1601-2008.

The thermal shock resistance of each sample was evaluated by the heat resistance temperature in an underwater As can be seen from Table 1, the sample No.s 5 to 15 each had a three-point bending strength of 280 MPa or more and a heat resistance temperature of 250° C. As a result, it was found that in a case where the content of all constituents of 100 mass % was formed of an alumina-based ceramic in which Al was 70 mass % or more and 89 mass % or less in terms of $Al_2O_3$, the sum of the values of Si in terms of $SiO_2$, Ca in terms of CaO, and Mg in terms of MgO was 11 mass % or more and 30 mass % or less, and an area ratio occupied by the glass in the surface portion was less than an area ratio occupied by the glass in the inner portion, both excellent mechanical strength and thermal shock resistance could be obtained.

Among the sample No.s 5 to 15, the sample No.s 10 to 15 each had a three-point bending strength of 295 MPa or more, and it was found that in a case where the area ratio occupied by the glass in the surface portion was less than the area ratio occupied by the glass in the inner portion by 4 area % or more, mechanical strength was improved.

Among the sample No.s 10 to 15, the sample No.s 10 and 12 to 15 each had a three-point bending strength of 303 MPa or more, and it was found that in a case where the area ratio occupied by the glass in the surface portion was 20 area % or less, mechanical strength was further improved.

The invention claimed is:

1. A ceramic member, wherein a surface portion comprises a region from a surface to a depth of 0.1 mm of the ceramic member, and an internal portion comprises a region having a depth of 0.5 mm or more from the surface of the ceramic member, the surface portion and the internal portion include an alumina-based ceramic including alumina crystals and a glass formed of Si, Ca, Mg, and O, an amount of the alumina crystals is 70 mass % or more and 89 mass % or less, an area ratio occupied by the glass in the internal portion is larger than an area ratio occupied by the glass in the surface portion, and a ratio of an internal portion area of glass to a surface portion area of glass is between 0.9 and 4.2.

2. The ceramic member according to claim 1, wherein the area ratio occupied by the glass in the internal portion is larger than the area ratio occupied by the glass in the surface portion by 4 area % or more.

3. The ceramic member according to claim 1, wherein the area ratio occupied by the glass in the surface portion is 20 area % or less.

4. The ceramic member according to claim 1, wherein an amount of the alumina crystals in the surface portion is larger than an amount of the alumina crystals in the internal portion.

* * * * *